(12) United States Patent
Hashimoto et al.

(10) Patent No.: US 6,838,030 B2
(45) Date of Patent: Jan. 4, 2005

(54) METHOD OF AND APPARATUS FOR MANUFACTURING MOLDED MATERIALS OF THERMOSETTING RESIN COMPOSITION

(75) Inventors: Osamu Hashimoto, Tokyo (JP); Kazuyuki Najima, Tokyo (JP); Ryuji Nozaki, Tokyo (JP)

(73) Assignee: Sumitomo Bakelite Company Limited, Tokyo (JP)

( * ) Notice: Subject to any disclaimer, the term of this patent is extended or adjusted under 35 U.S.C. 154(b) by 389 days.

(21) Appl. No.: 10/032,066

(22) Filed: Dec. 31, 2001

(65) Prior Publication Data

US 2003/0020200 A1 Jan. 30, 2003

(30) Foreign Application Priority Data

Jul. 30, 2001 (JP) ......................................... 2001-229053

(51) Int. Cl.[7] ................................................ B02C 4/02
(52) U.S. Cl. ........................ 264/144; 264/146; 264/147; 264/157
(58) Field of Search ................................ 264/141, 143, 264/146, 147, 157, 144; 425/296, 304; 241/221

(56) References Cited

U.S. PATENT DOCUMENTS

| | | | | |
|---|---|---|---|---|
| 3,470,595 A | * | 10/1969 | Goppel | 19/46 |
| 4,042,658 A | * | 8/1977 | Collins | 264/45.5 |
| 4,056,592 A | * | 11/1977 | Izumi et al. | 264/141 |
| 4,340,557 A | * | 7/1982 | Gross | 264/146 |
| 4,737,407 A | * | 4/1988 | Wycech | 428/323 |
| 5,582,786 A | * | 12/1996 | Brunskill et al. | 264/103 |
| 6,428,298 B1 | * | 8/2002 | Clauss et al. | 425/71 |

* cited by examiner

Primary Examiner—Mark Eashoo
(74) Attorney, Agent, or Firm—Oblon, Spivak, McClelland, Maier & Neustadt, P.C.

(57) ABSTRACT

A method of manufacturing molded materials of a thermosetting resin composition in a method of granulating a molding material of the thermosetting resin composition, in which a sheet producing step for transferring the molding material in a molten state to a subsequent stage while processing the same material into a sheet type material of a predetermined thickness, a first processing step for cutting the sheet type material, which has thus been transferred to a stage for carrying out this step, in parallel with the transfer direction thereof to a predetermined width, and thereby obtaining a processed body of laterally arranged rows of elongated string-like materials, a step of cutting the processed body, which is obtained in the first processing step, to a predetermined length with respect to the transfer direction, a transfer direction changing step for transferring the processed body, which has been subjected to the cutting step, to a subsequent stage by changing the transfer direction of the processed body at 90 degrees with respect to the longitudinal processed body cutting line, and a second processing step for cutting the processed body, the transfer direction of which has been changed, in parallel with the processed body transferring direction to a predetermined width, and thereby obtaining granulated materials are carried out in order.

7 Claims, 5 Drawing Sheets

METHOD OF AND APPARATUS FOR MANUFACTURING MOLDED MATERIALS OF THERMOSETTING RESIN COMPOSITION

TECHNICAL FIELD TO WHICH THE INVENTION BELONGS

This invention relates to a method of and an apparatus for manufacturing molded materials of a thermosetting resin composition, which include melting and kneading a molding material of a thermosetting resin composition containing a thermosetting resin, such as a phenol resin and a curing agent, and continuously granulating the resultant melt-kneaded product, and which rarely encounter the occurrence of fine powder during the transfer of the molding material from one stage to another and after the completion of the manufacturing of the granulated products.

RELATED ART

In a general related art method of granulating a molded material of a thermosetting resin composition, raw materials are compounded, and the resultant product is then subjected to mixing, kneading and cooling, the resultant product being taken out as a massive or sheet type material, which is thereafter granulated by pulverizing the same to a predetermined grain size. However, in the pulverization step in this method, fine powder is liable to occur, and the granular molded materials of a thermosetting resin composition obtained by this method are also liable to generate fine powder even after the manufacturing thereof finishes, due to vibration occurring during the granulated product manufacturing process. The fine powder occurring during the manufacturing process causes the yield of the products to decrease. The fine powder occurring due to a vibrating force imparted to the products during the transfer thereof after the execution of packaging and shipping operations therefor floats as dust during the handling of the products, and is undesirable from the viewpoint of the environmental sanitation. The granulating of the molding material of a thermosetting resin composition by an extrusion granulator comparatively rarely encounters the occurrence of fine powder, and is desirable from the viewpoint of the environmental sanitation but the productivity is low.

The present invention has been made in view of the above-mentioned circumstances, and provides a method of and an apparatus for granulating a molding material of a thermosetting resin composition, capable of easily obtaining granular molded materials of a uniform grain size of a thermosetting resin composition, capable of carrying out a continuous granulating operation for a long period of time, having a high productivity, and rarely encountering the occurrence of fine powder during the transfer of the molding material from one stage to another and after the completion of the manufacturing of the granulated products.

MEANS FOR SOLVING THE PROBLEMS

The present invention (1) provides a method of manufacturing molded materials of a thermosetting resin composition in a method of granulating a molding material of the thermosetting resin composition, in which a sheet producing step for transferring the molding material in a molten state to a subsequent stage while processing the same material into a sheet type material of a predetermined thickness, a first processing step for cutting the sheet type material, which has thus been transferred to a stage for carrying out this step, in parallel with the transfer direction thereof to a predetermined width, and thereby obtaining a processed body of laterally arranged rows of elongated string-like materials, a step of cutting the processed body, which is obtained in the first processing step, to a predetermined length with respect to the transfer direction, a transfer direction changing step for transferring the processed body, which has been subjected to the cutting step, to a subsequent stage by changing the transfer direction of the processed body at 90 degrees with respect to the longitudinal processed body cutting line, and a second processing step for cutting the processed body, the transfer direction of which has been changed, in parallel with the processed body transferring direction to a predetermined width, and thereby obtaining granulated materials are carried out in order.

The present invention (2) provides the method of manufacturing molded materials of a thermosetting resin composition according to the method described in (1) above, in which a second processing step for making a multiplicity of slits in the transfer-direction-changed processed body after the transfer direction changing step has been carried out, in parallel with the transfer direction of the processed body to a predetermined width, and thereby obtaining a processed body of longitudinally arranged rows of elongated string-like materials having longitudinal slits of a predetermined width, and a step of applying an external force to the processed body obtained in the second processing step, and thereby obtaining granulated materials are carried out in order.

The present invention (3) provides a method of manufacturing molded materials of a thermosetting resin composition in a method of granulating a molding material of the thermosetting resin composition, in which a sheet producing step for transferring the molding material in a molten state to a subsequent stage while processing the same material into a sheet type material of a predetermined thickness, a first processing step for making a multiplicity of slits in the sheet type material, which has been transferred to a stage for carrying out this step, in parallel with the transfer direction thereof to a predetermined width, and thereby obtaining a sheet type processed body in which a multiplicity of longitudinal slits are formed, a step of cutting the sheet type processed body, which has been obtained in the first processing step, to a predetermined length with respect to the transfer direction, a transfer direction changing step for transferring the processed bodies, which have been subjected to the cutting step, to a subsequent stage by changing the transfer direction of the processed bodies at 90 degrees with respect to the longitudinal processed body cutting line, a second processing step for cutting the processed body, the transfer direction of which has been changed, in parallel with the processed body transferring direction to a predetermined width, and thereby obtaining a processed body of laterally arranged rows of elongated string-like materials in which a multiplicity of lateral slits are formed in a longitudinally spaced manner, and a step of applying an external force to the processed body of laterally arranged rows of processed materials, which have been obtained in the second processing step, and thereby obtaining granulated materials are carried out in order.

The present invention (4) provides a method of manufacturing molded materials of a thermosetting resin composition according to the method described in (3) above, in which a second step of making a multiplicity of slits after the execution of the transfer direction changing step in the processed body, the transfer direction of which has been changed, in parallel with the transfer direction to a predetermined width, and thereby obtaining a sheet type processed body having generally checker-patterned slits, and a step of applying an external force to the sheet type processed body obtained in the second processing step, and thereby obtaining granulated materials are included.

The present invention (5) provides an apparatus for manufacturing molded materials of a thermosetting resin composition by granulating a molding material of the thermosetting resin composition, including rolling rolls for rolling the molding material in a molten state into a sheet type material of a predetermined thickness, a first processing unit for processing the rolled sheet type material into a processed body of laterally arranged rows of string-like materials of a predetermined width, or into a sheet type processed body having a multiplicity of slits extending in parallel with the sheet type material transferring direction, a cutter for cutting the processed body, which has been obtained by the first processing unit, in the processed body transferring direction to a predetermined length, a direction changing unit for changing the transfer direction of the processed body, which has been cut with the cutter, at 90 degrees with respect to the longitudinal cutting line or slitting line of the processed body, and a second processing unit for cutting or slitting the processed body, the transfer direction of which has been changed by the direction changing unit, in parallel with the transfer direction thereof to a predetermined width.

Figure 1:
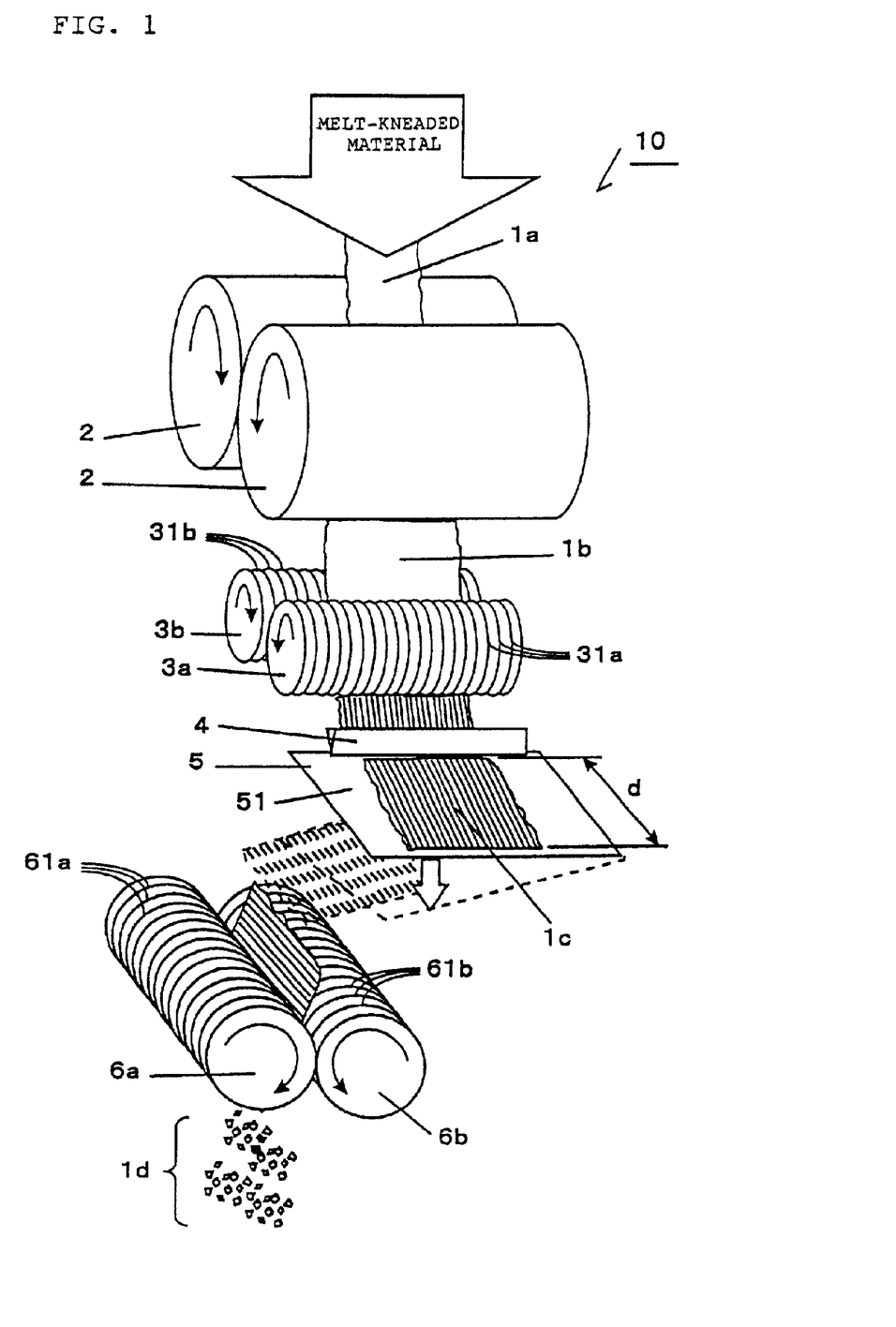
FIG. 1 illustrates a method of manufacturing molded products of a thermosetting resin composition in an embodiment of the present invention.
Figure 2:
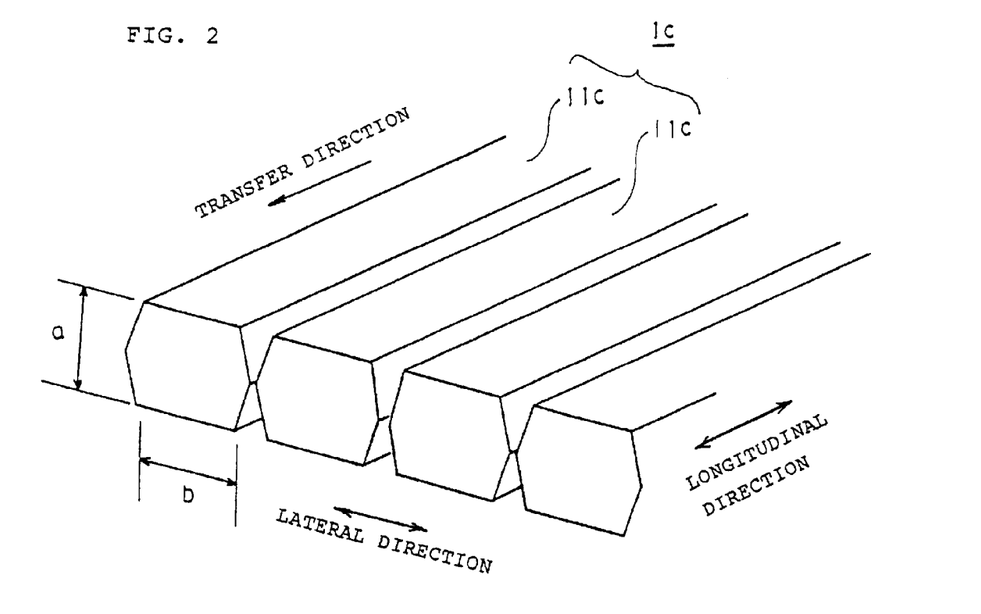
FIG. 2 is a schematic diagram showing a processed body of laterally arranged rows of elongated string-like materials obtained in a first processing step.
Figure 3:
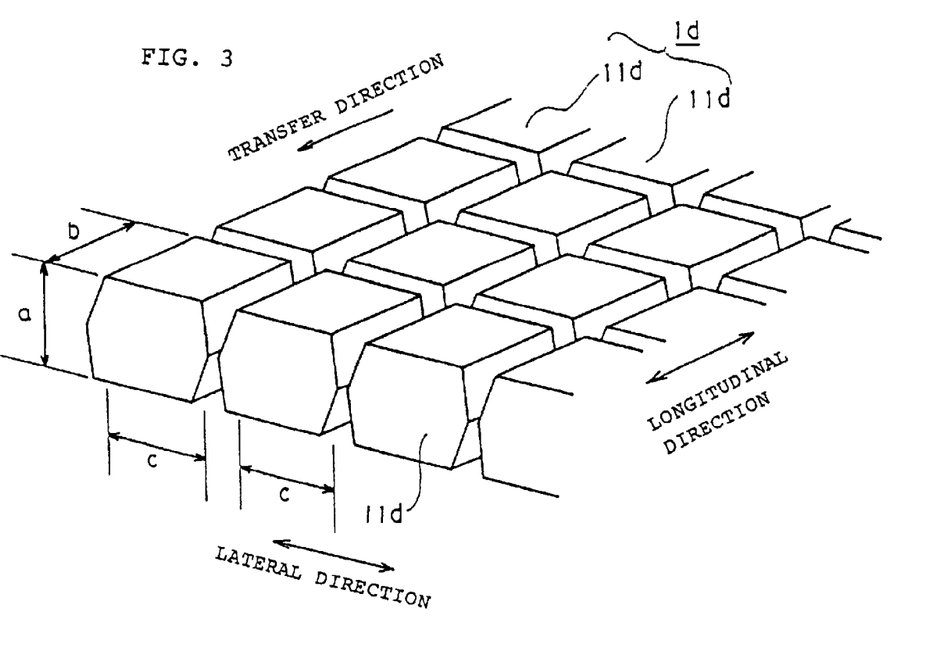
FIG. 3 is a schematic diagram for having the shape of granulated products understood easily which are obtained by cutting the processed body of FIG. 2 in the cutting direction in a second processing step.

Modes of Embodiment of the Invention:

The method of manufacturing molded materials of a thermosetting resin composition in a first mode of embodiment of the present invention will now be described with reference to FIG. 1 to FIG. 3. FIG. 3 is a drawing showing the condition different from the actual condition. Actually, after a process carried out by second grooving rolls 6a, 6b has finished, a multiplicity of granulated materials fall scatteringly into a recovery vessel as shown in FIG. 1. In this specification, "longitudinal direction" or "length" means or refers to transfer direction, while "lateral direction" or "width" means or refers to a direction crossing the transfer direction at right angles. Accordingly, the "width" of a molded material in the first processing step is turned into "length" in the second processing step. An apparatus 10 for manufacturing molded materials of a thermosetting resin composition, which embodies the manufacturing method in the first mode of embodiment, includes a pair of rolling rolls 2, 2, a pair of first grooved rolls 3a, 3b (first processing unit), a cutter 4, a direction changing unit 5, and a pair of second grooved rolls 6a, 6b (second processing unit).

The two rolling rolls 2, 2 are not specially limited as long as the rolls are capable of rolling a molding material 1a in a molten state and obtaining a sheet type material 1b of a predetermined thickness a. Rolling rolls provided with scrapers (not shown) for forcibly peeling off the rolled sheet type molded material 1b therefrom are preferable as the rolling rolls 2, 2 since such rolls can transfer the sheet type molding material 1b smoothly to a subsequent stage. The rolling rolls 2, 2 are provided with temperature regulating units (not shown) constituting arbitrary structural elements capable of regulating surface temperature of the rolling rolls 2, 2 between normal temperature and 130° C. Devices containing on the inner side of outer surfaces of the rolling rolls 2, 2 heating circuits or heaters using hot water or steam as a heating medium can be used as the temperature regulating units. When the surface temperature of the rolling rolls 2, 2 is set in the above-mentioned range, a cutting process and a slitting process in the first processing step and second processing step can be set easily practicable without denaturing the molding material.

The paired first grooved rolls 3a, 3b are adapted to process the rolled sheet type molded material 1b into a processed body 1c having a multiplicity of laterally arranged rows of elongated string-like materials of a predetermined width b, and the rolls are provided in their outer surfaces with a multiplicity of cutting edges 31a arranged at a predetermined interval b in the axial direction of the rolls. In this embodiment, a distance between free ends of the cutting edges 31a, 31b which are opposed to each other of the first grooved rolls 3a, 3b is set to zero, while the height of the cutting edges 31a, 31b are all set larger than a/2. This enables the rolled sheet type molding material 1b to be formed into the processed body 1c of laterally arranged rows of elongated string-like materials 11c of b in width and a in height. Since the first grooved rolls 3a, 3b are provided so that the axes of the rolls 3a, 3b become parallel to those of the rolls 2, 2, the sheet type molding material transferring direction is kept unchanged, and the sheet type molded material 1b is not distorted. Grooved rolls provided with scrapers (not shown) for forcibly peeling off the processed body 1c of the laterally arranged rows of elongated string-like materials 11c therefrom are preferable as the first grooved rolls 3a, 3b since these rolls can transfer the processed body 1c smoothly to a subsequent stage.

The cutter 4 is adapted to cut the processed body 1c of the laterally arranged rows of elongated string-like materials, which are obtained through the first grooved rolls 3a, 3b, to a predetermined length d with respect to the transfer direction. Cutting the processed body 1c to a predetermined length d enables the transfer direction of the processed body 1c in a subsequent stage to be changed at 90 degrees with respect to the direction in which the processed body 1c has theretofore been transferred. The predetermined length d to which the processed body 1c is cut is equal to or somewhat smaller than a processing width of the second grooved rolls 6a, 6b. This enables the execution of the cutting process or slitting process in the second processing step.

The direction changing unit 5 is adapted to change the transfer direction of the processed body 1c, which has been cut with the cutter 4 and transferred thereto, at 90 degrees with respect to the longitudinal cutting line of the processed body 1c. Namely, this operation constitutes a method of receiving the processed body 1c, which has been cut with the cutter 4 and transferred forward, on, for example, a flat table 51, and further transferring the processed body in the direction which orthogonally crosses the processed body receiving direction. The direction changing unit 5 in the present invention is not limited to this. The direction changing operation may be carried out by another method. In this method, for example, the flat table 51 is formed so that it can be turned freely at 90 degrees, and the direction in which the processed body 1c on the flat plate 51 is to face with respect to the transfer direction thereof is changed by 90 degrees without changing the direction in which the processed body 1c is transferred from the cutter 4.

The second grooved rolls 6a, 6b are adapted to cut the processed body 1c, the direction of which has been changed by the direction changing unit 5, in parallel with the transfer direction thereof to a predetermined width $c$. Grooved rolls having the same construction as the first grooved rolls 3a, 3b can be used as the second grooved rolls 6a, 6b. Namely, the second grooved rolls 6a, 6b are provided with scrapers (not shown) for forcibly peeling off the granular molded materials 1d therefrom. The distance between free ends of cutting edges 61a, 61b of the second grooved rolls 6a, 6b is also set to zero, while the height of the cutting edges 61a, 61b is all set larger than a/2. This enables the processed body 1c of the longitudinal arranged rows of elongated string-like materials 11c to be processed into granulated materials 11d of $c$ in width, $b$ in length and $a$ in height. Referring to FIG. 1, the second grooved rolls 6a, 6b are provided so that the axes thereof cross those of the rolling rolls 2, 2 and first grooved rolls 3a, 3b at right angles thereto.

The method of manufacturing molded materials of a thermosetting resin composition in a first mode of embodiment of the present invention will now be described. In a method of granulating a molded material of a thermosetting resin composition, the sheet producing step is a step of introducing the molding material 1a in a molten state between the two rolling rolls 2, 2, and transferring the molding material 1a while rolling the same into $a$ sheet type material having a thickness corresponding to that a of a final granulated materials. In this step, introducing the molding material 1a melt-kneaded by a heating roll (not shown) to a temperature of 70 to 130° C., preferably to a temperature in the range of 80 to 110° C. between the rolling rolls 2, 2 and rolling the same, and setting the temperature of the sheet type material 1b also to a temperature of 70 to 130°, preferably to a temperature substantially equal to the temperature at which the molding material is introduced between the rolling rolls 2, 2 are preferable since these operations enable the softness of the material needed for the processing operation in a subsequent stage to be retained with out degenerating the sheet type molding material. Therefore, rolling rolls the surface temperature of which can be regulated to a temperature between normal temperature and 130° C. are preferably used. When the temperature of the molding material 1a is too low, the material becomes liable to be broken in some cases in the first processing step, and, when this temperature is too high, the molding material sticks to the first grooved rolls 3a, 3b, and it becomes difficult to carry out a smooth processing operation. The molding material in a molten state is a molding material of a thermosetting resin composition melt-kneaded in known kneading equipment, such as a kneading roll, a uniaxial extruder, a biaxial kneading extruder, a planetary kneading extruder, a cokneader and the like. According to the above-mentioned rolling step, the processing operations carried out by the grooved rolls in the first processing step and second processing step are stabilized, and the molding material is compacted. Moreover, granular molded materials rarely deformed even due to an impact and friction which the materials receive in a later stage, and rarely encountering the occurrence of fine powder are obtained.

After the sheet producing step finishes, the first processing step is carried out. The first processing step aims at obtaining (refer to FIG. 2) a processed body 1c of a multiplicity of laterally arranged rows of continuous elongated string-like materials 11c of $a$ in thickness and $b$ in width by introducing the sheet type material 1b between the two grooved rolls 3a, 3b, and cutting the sheet type material 1b into a multiplicity of parts in the direction parallel to the transfer direction thereof to a predetermined width, i.e., to a width $b$ corresponding to the length of final granulated materials. The external appearance of the processed body 1c of the laterally arranged rows of elongated string-like materials 11c is like that of a so-called rigid frame. Since the distance between the free ends of the opposed cutting edges 31a, 31b of the first grooved rolls 3a, 3b is zero, the sheet type molding material 1b is cut in the longitudinal direction at intervals equal to those b of adjacent cutting edges 31a, 31a. When the temperature of the sheet type molding material passed through the rolling rolls in the sheet producing stage in the first processing step is maintained at 70 to 130° C., preferable results are obtained since the cutting stability of the sheet type molding material is improved. Using the scrapers (not shown) when the processed body 1c of the laterally arranged rows of multiple elongated string-like materials 11c are sent out from the first grooved rolls 3a, 3b is preferable for smoothly carrying out the transferring of the material to a subsequent stage.

After the first processing step finishes, the step of cutting the processed body obtained in the first processing step to a predetermined length with respect to the transfer direction thereof is carried out. In this embodiment, the processed body 1c of the laterally arranged rows of multiple elongated string-like materials 11c which has subjected to the first processing step is once received by the direction changing unit 5 provided with the flat table 51. The processed body 1c is cut to the length $d$ in a position in the vicinity of an upstream side portion of the flat table 51 with respect to the processed body transferring direction. Consequently, the processed body 1c of the laterally arranged rows of the elongated string-like materials 11c of $a$ in thickness, $b$ in width and $d$ in length can be obtained.

After the cutting step finishes, the transfer direction changing step for transferring the processed body which has been subjected to the cutting step to a subsequent stage by changing the direction of the processed body at 90 degrees with respect to the transfer direction thereof is carried out. In this embodiment, a method of transferring the processed body 1c of the laterally arranged rows of the elongated string-like materials 11c, which are placed on the flat table 51 of the direction changing unit 5, to a subsequent stage in the direction crossing at 90 degrees the direction in which the processed body is transferred to the flat table 51 is used. Consequently, the processed body 1c of the longitudinally arranged rows of multiple elongated string-like materials 11c of $a$ in thickness, $d$ in width and $b$ in length are transferred to a subsequent stage.

After the transfer direction changing step finishes, the second processing step for obtaining granulated materials by cutting the direction-changed processed body in parallel with the processed body transferring direction to a predetermined width is carried out. Namely, the second processing step is a step (refer to FIG. 3) using the same second paired grooved rolls 6a, 6b as in the first processing step, and carried out by introducing the processed body 1c between the second paired grooved rolls 6a, 6b, and cutting the processed body in parallel with the transfer direction thereof to a predetermined width c so as to obtain a multiplicity of granulated materials 11d of a in thickness, c in width and b in length. Since the distance between free ends of opposed cutting edges 61a, 61b of the second grooved rolls 6a, 6b, i.e. the distance between these rolls is zero in this step, the processed body 1c is cut longitudinally at intervals c equal to those of adjacent cutting edges 61a, 61a. When the temperature of the processed body 1c is maintained in the range of 70 to 130° C. in this case, preferable results are obtained since the cutting stability of the processed body 1c is improved. When the multiple granulated materials 11d are discharged from the second grooved rolls 6a, 6b, it is preferable to use scrapers (not shown) since the use thereof enables a smooth recovering operation to be carried out. The thickness a, width c and length b of the granulated materials 11d are not limited to those in this embodiment. These sizes are determined suitably in the range of, for example, 0.5 to 4 mm respectively by suitably selecting the distance between the rolling rolls, and the intervals, etc. of the cutting edges of the grooved rolls used in the first processing step and second processing step. The thickness a of the sheet type molding material 1b increases little by little as the material passes through the first processing step and second processing step, so that the thickness a of the granulated materials obtained after the execution of the second processing step is somewhat larger than that of the sheet type molding material 1b. According to the first mode of embodiment, the molding material is compacted in the rolling step, so that a molding material difficult to be deformed even due to an impact and friction and the like which the material receives in a later step can be obtained. In the first processing step, a processed body of laterally arranged rows of elongated string-like materials is obtained by a cutting operation. In the second processing step, a processed body of longitudinally arranged rows of elongated string-like materials is cut into small pieces in the longitudinal direction, so that granular molded materials of a uniform grain size of a thermosetting resin composition can be obtained easily. In this embodiment, a long-term continuous granulated material producing operation can be carried out, and a high productivity is attained. Moreover, fine powder does not occur during the transferring of the material between the processing stages, so that the yield of the products does not lower. Even when vibration of the products occurs during the transferring thereof after the manufacturing operation therefor finishes, the products rarely encounters the occurrence of fine powder and problems concerning the environmental sanitation rarely arise.

The method of manufacturing molded materials of a thermosetting resin composition in a second mode of embodiment will now be described. In this second mode of embodiment, portions constituting differences between this mode of embodiment and the first mode of embodiment will be mainly described. Namely, the portions of the second mode of embodiment constituting the differences between the same mode of embodiment and the first mode of embodiment reside in the steps carried out in order which include a second processing step for making a multiplicity of slits after the execution of such a transfer direction changing step as mentioned above in the transfer direction-changed processed body 1c in parallel with the transfer direction to a predetermined width c and thereby obtaining a processed body of longitudinally arranged rows of elongated string-like materials having longitudinal slits of a predetermined width, and a step of applying an external force to the processed body of the longitudinally arranged rows of string-like materials obtained in the second step and thereby obtaining granulated materials. Namely, the manufacturing apparatus used in the manufacturing method of the second mode of embodiment and that used in the manufacturing method of the first mode of embodiment are different from each other in the set value of the distance between the second grooved rolls 6a, 6b. In the second grooved rolls 6a, 6b used in the second processing step in the second mode of embodiment, the distance between free ends of opposed cutting edges 61a, 61b of the second grooved rolls 6a, 6b, i.e. the inter-roll distance is set to, for example, around 0.2 mm. Namely, when the processed body 1c is introduced between the two grooved rolls 6a, 6b in the second processing step in this embodiment, the processed body 1c is not cut off but longitudinally slitted at intervals c in parallel with the processed body transferring direction. This enables elongated string-like materials provided with a multiplicity of slits at predetermined intervals c, and having a thickness a, a length b and a width d to be obtained. A coarsely crushing step for obtaining granulated materials by applying an external force to the processed body of longitudinally arranged rows of processed materials obtained in the second step is then carried out. In the coarsely crushing step, the processed body of longitudinally arranged rows of processed materials obtained in the second step is cooled usually to a temperature in the vicinity of room temperature, and an external force is then applied to the cooled processed bodies. The method of applying an external force to the processed bodies is not specially limited. For example, a method using a hammer mill or an automatic miniaturized mixer is included. According to this embodiment, effects identical with those in the first mode of embodiment are displayed. In addition, a processed body of laterally arranged rows of elongated string-like materials is obtained by a cutting operation in the first processing step, and processed bodies of longitudinally arranged rows of elongated materials are slitted closely in the longitudinal direction in the second processing step. Therefore, when an external force is applied to these processed bodies, granulated materials are easily obtained.

Figure 4:
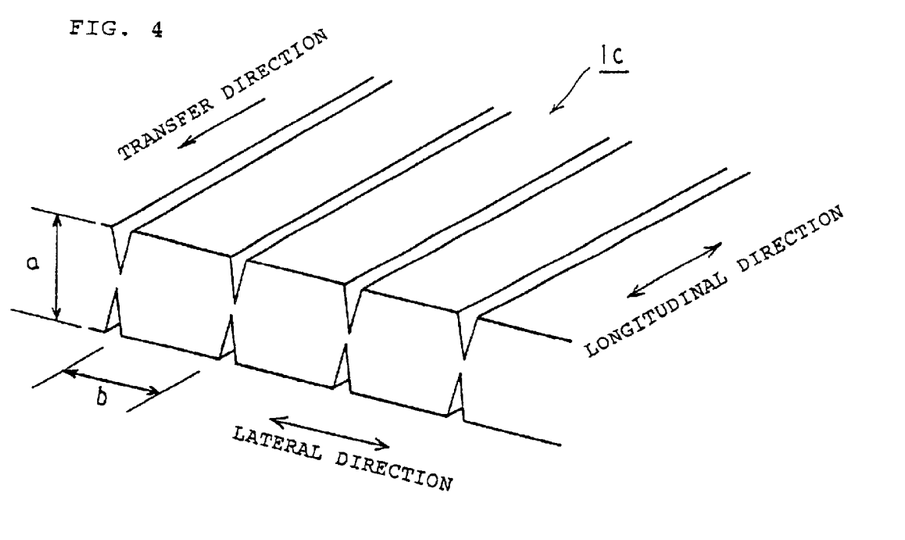
FIG. 4 is a schematic diagram showing a sheet type processed body obtained in the first processing step in third and fourth modes of embodiment.

The method of manufacturing molded materials of a thermosetting resin composition in a third mode of embodiment will now be described. Concerning the third mode of embodiment, the portions thereof which constitute the differences between this mode of embodiment and the first mode of embodiment will be mainly described. Namely, the differences between the third mode of embodiment and the first mode of embodiment reside in a first processing step, which is carried out after the execution of a sheet producing step, for making a multiplicity of slits at predetermined intervals b in parallel with the direction in which a sheet type material 1b is transferred, and thereby obtaining a recessed and projecting sheet type processed body 1c having a multiplicity of longitudinal slits; a second processing step, which is carried out after the execution of a transfer direction changing step, for cutting the processed body, the transfer direction of which has been changed, in parallel with the transfer direction to a predetermined width, and thereby obtaining a processed body of laterally arranged rows of elongated string-like materials having a multiplicity of lateral slits; and a final step for applying an external force to the processed body of laterally arranged rows of processed materials obtained in the second processing step, and thereby obtaining granulated materials. A manufacturing apparatus used in the manufacturing method in the third mode of embodiment and that used in the manufacturing method in the first mode of embodiment differ from each other in a set value of the distance between the first grooved rolls 3a, 3b. In the third embodiment, the distance between free ends of opposed cutting edges 31a, 31b of the first grooved rolls 3a, 3b used in the first processing step, i.e. the inter-roll distance is set to, for example, around 0.2 mm. When the sheet type molding material 1b is introduced between the two grooved rolls 3a, 3b in the first processing step in this embodiment, the sheet type material 1b is not cut off but slitted in parallel with the sheet type material transferring direction at intervals b. Consequently, longitudinally continuous recessed and projecting sheet type material 1c provided with a multiplicity of lateral slits at predetermined intervals b, and having a thickness a and a width d is obtained (refer to FIG. 4). After a cutting step and a transfer direction changing step have finished, a second processing step is carried out in which the recessed and projecting sheet type material of a in thickness and d in width having lateral slits arranged longitudinally at intervals b is cut off. The cutting operation in the second processing step is carried out by a method identical with that used in the second processing step in the first mode of embodiment. Namely, the processed body 1c is introduced between the two second grooved rolls 6a, 6b, and then cut in parallel with the processed body transferring direction to a predetermined width c to obtain a processed body of laterally arranged rows of elongated string-like materials of a in thickness and c in width having a multiplicity of lateral slits. A coarsely crushing step for applying an external force to the processed body of longitudinally arranged rows of string-like materials obtained in the second processing step, and thereby obtaining granulated materials is then carried out. This coarsely crushing step is carried out in the same manner as that in the second mode of embodiment. According to the invention of the third embodiment, effects identical with those obtained in the above-mentioned invention (1) are displayed. In addition, a sheet type processed body provided with a multiplicity of slits in parallel with the transfer direction thereof so that the slits are arranged at predetermined intervals is obtained in the first processing step. In the second processing step, a sheet type processed body is turned into a processed body of laterally arranged rows of elongated string-like materials having lateral slits, granulated materials are obtained easily when an external force is applied thereto.

Figure 5:
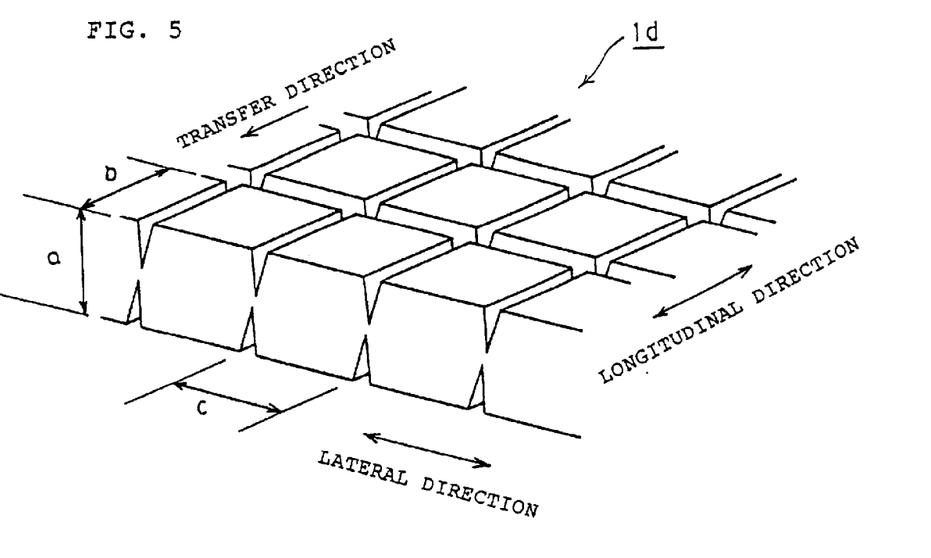
FIG. 5 is a schematic diagram showing sheet type processed body obtained in the second processing step in the fourth mode of embodiment.

The method of manufacturing molded materials of a thermosetting resin composition in a fourth mode of embodiment will now be described. In the fourth mode of embodiment, the portions thereof constituting differences between the same mode of embodiment and the third mode of embodiment will be mainly described. Namely, the portions of the fourth embodiment constituting the mentioned differences reside in a second processing step, which is carried out after the execution of a transfer direction changing step, for making a multiplicity of slits in a processed body, the transfer direction of which has been changed, in parallel with the transfer direction at predetermined intervals, and thereby obtaining a sheet type processed body having slits of a checker pattern. A manufacturing apparatus used in the manufacturing method in the fourth mode of embodiment and that used in the manufacturing method in the first mode of embodiment differ from each other in a set value of the distance between the first grooved rolls 3a, 3b and that between second grooved rolls 6a, 6b used in the second processing step. The distances between free ends of opposed cutting edges of the first grooved rolls 3a, 3b and second grooved rolls 6a, 6b used in the fourth embodiment, i.e. inter-roll distances are all set to, for example, around 0.2 mm. When a processed body 1c, which has been subjected to the same first processing step, cutting step and transfer direction changing step as in the third mode of embodiment, is introduced between the paired grooved rolls 6a, 6b, the processed body 1c is formed into a sheet type material of c in width and b in length having slits of a checker pattern (FIG. 5). According to this embodiment, the effects identical with those in the third mode of embodiment are displayed. In addition, a sheet type processed body having a multiplicity of slits extending in parallel with the transfer direction thereof at predetermined intervals is obtained in the first processing step. When an external force is applied to the processed body in the second processing step so as to make slits minutely in the longitudinal direction and thereby form slits of a checker pattern therein, granulated materials are obtained easily.

The thermosetting resin compositions used in the present invention include a thermosetting resin by itself or a resin composition containing at least a thermosetting resin and a curing agent. The thermosetting resins include phenol resins, such as resol phenol resin and novolak phenol resin, etc., epoxy resin, polyimide resin, polyester resin, etc. When the thermosetting resin in use is a novolak phenol resin, hexamethylene tetramine is usually used as a curing agent. The resin composition may further contain a filler. As the filler, an inorganic substance, such as glass fiber, calcium carbonate, clay, mica, silica, etc., and an organic substance, such as wood flour, pulp, woven fiber, thermosetting hardened resinous substance, etc. are enumerated.

Figure 6:
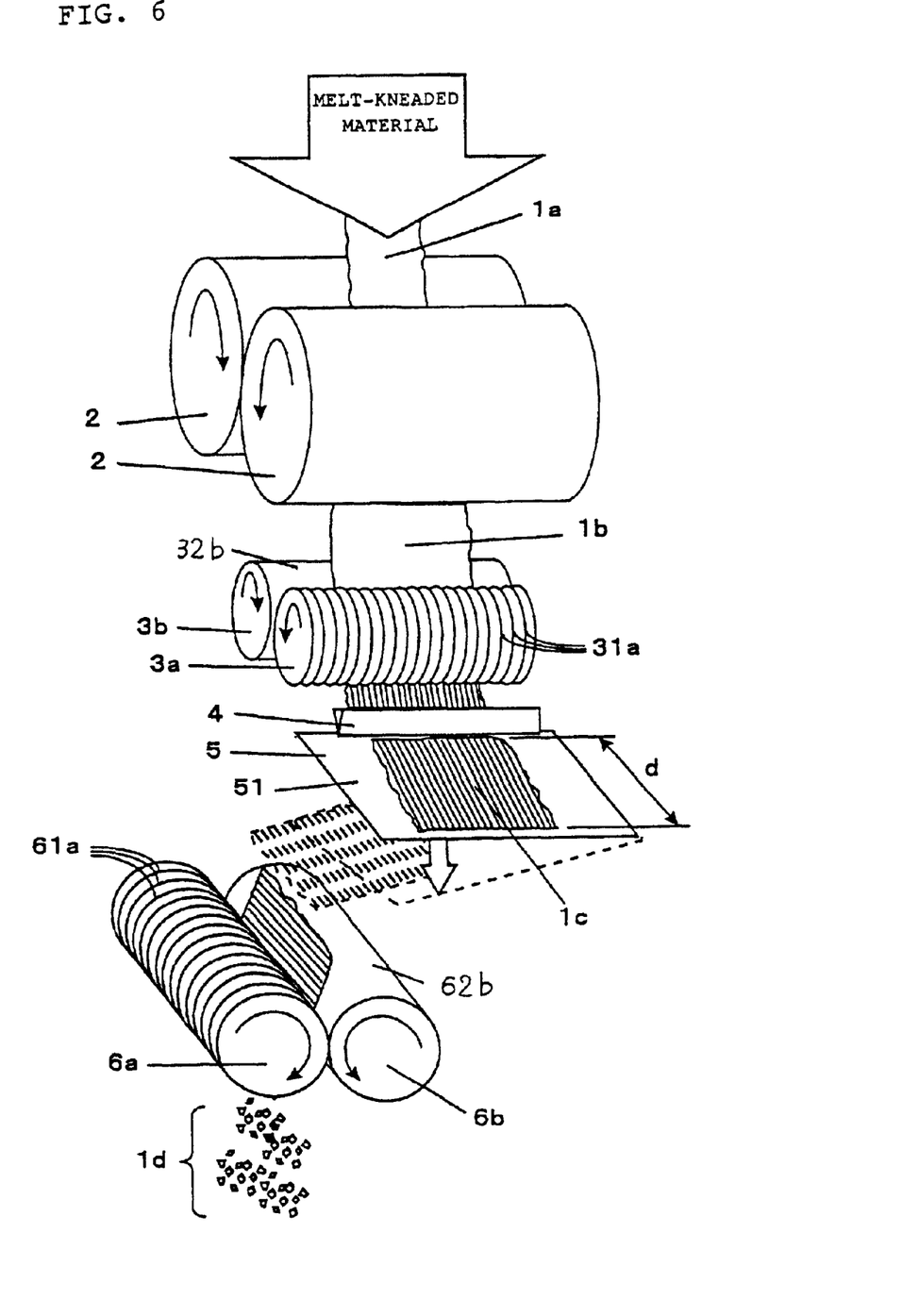
FIG. 6 is a drawing showing other mode of first grooved rolls and second grooved rolls.
Figure 7:
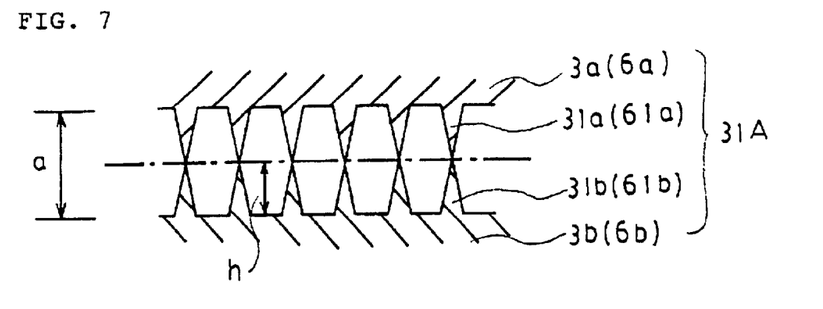
FIGS. 7 to 9 are partial sectional views describing modes of cutting edges of the first grooved rolls and second grooved rolls.
Figure 8:
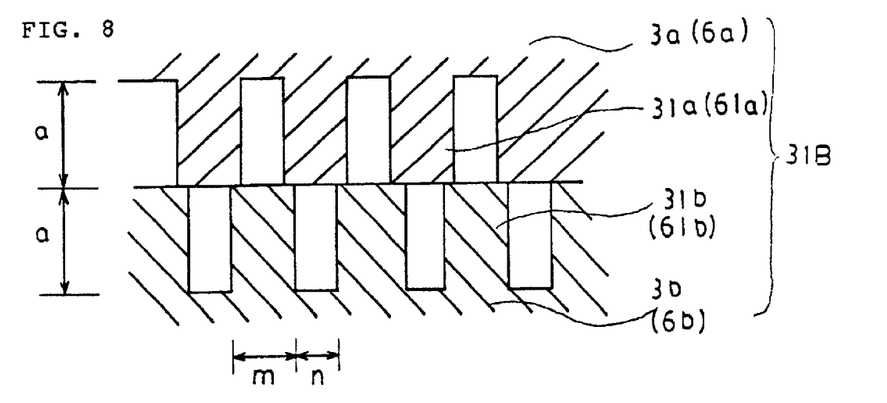
Figure 9:
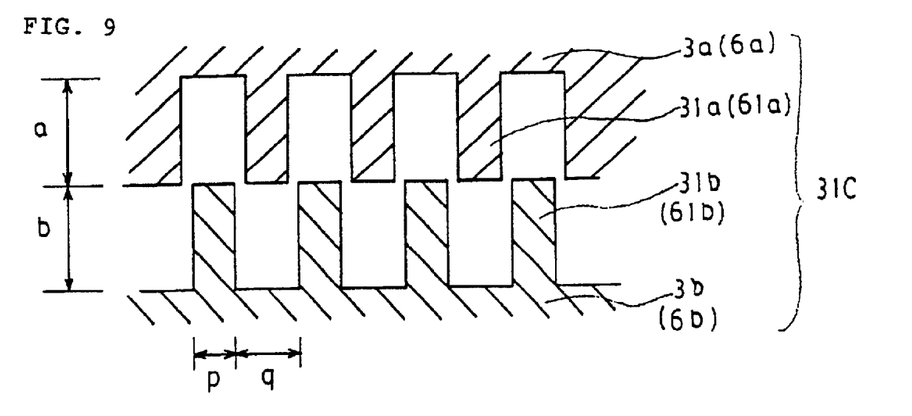

In the apparatus 10 for manufacturing molded materials of a thermosetting resin composition according to the present invention, the first grooved rolls 3a, 3b and second grooved rolls 6a, 6b which form the first processing unit and second processing unit can also be selectively replaced with a combination shown in FIG. 6 of a grooved roll 3a and a flat roll 3b having a cutting edgeless flat surface 32b, or a combination of a grooved roll 6a and a flat roll 6b having a cutting edgeless flat surface 62b besides the combination of the mode shown in FIG. 1. In such cases, the regulating of the cutting edges of the grooved rolls and the managing of the cutting edges and the function of scrapers are done easily. Although the shape of the cutting edges or slitting edges of the first grooved rolls 3a, 3b and second grooved rolls 6a, 6b is not specially limited, these edges may also be shaped like a cutting edge 31A (FIG. 7) including cutting edges 31a, 31b, 61a, 61b the free end portions of which have an acute cross section, and the depth h of the chip spaces of which is larger than about a/2; a contact cutting edge 31B (FIG. 8) including cutting edges 31a, 31b, 61a, 61b which have a rectangular cross section, chip spaces of a depth h larger than a, and an edge width m larger than a chip space width n, and which are formed so that one side cutting edge portions 31a, 61a and the chip spaces of the other side cutting edge portions 31b, 61b are opposed to each other; and an engagement slitting edge 31c (FIG. 9) including cutting edges 31a, 31b, 61a, 61b which have a rectangular cross section and a chip space width q larger than an edge width p, and which are formed so that one side cutting edge portions 31a, 61a and the chip spaces of the other side cutting edge portions 31b, 61b are opposed to each other. The free end of the cutting edge 31A of FIG. 7 may be rounded or have a flat surface. In any of the combinations of grooved rolls of FIG. 7 to FIG. 9, one grooved roll may be a flat roll having a flat surface.

(Embodiments)

Embodiment 1

The same apparatus 10 for manufacturing molded materials of a thermosetting resin composition as shown in FIG. 1 was used. First, 34 parts by weight of powdered novolak-based phenol resin, 6 parts by weight of powdered hexamethylene tetramine as a curing agent, a total of 55 parts by weight of inorganic fillers including 45 parts by weight of glass fiber chops and 10 parts by weight of clay, and a total of 5 parts by weight of other additive agents including 2 parts by weight of calcium hydroxide as a curing accelerator, 2 parts by weight of stearic acid as a mold lubricant and 1 part by weight of carbon black as a coloring agent were mixed in a blender. The resultant mixture was melt-kneaded by a heating roll the surface temperature of which was set to 100° C. to obtain a molding material. This molding material was immediately introduced between rolling rolls having a clearance of 2 mm and temperature-regulated to 40° C. so as to roll the material. The rolled material was then passed between two first grooved rolls having continuous scrapers, a chip space width of 2 mm and a clearance (roll clearance) of 0 mm between the free ends of opposed cutting edges, and formed into a processed body (rigid frame-like body) of laterally arranged rows of elongated string-like materials. The processed body (rigid frame-like body) of laterally arranged rows of elongated string-like materials was cut to a length of 400 mm, and the transfer direction of this material was thereafter changed at 90 degrees by a direction changing unit, the processed body having then been passed between paired second grooved rolls provided with continuous scrapers, and having a chip space width of 2 mm and a clearance (roll clearance) of 0 mm in width between free ends of opposed cutting edges thereof to manufacture granular molded materials of a phenol resin composition. First grooved rolls and second grooved rolls the shape of which was the same as that of the grooved rolls shown in FIG. 7 were used.

The raw molded materials thus obtained were processed in a self-revolving type miniaturized mixer for 15 minutes. The resultant materials were sieved by using a vibrating screen to ascertain the grain size distribution thereof. The results showed that the materials of a grain size of 1 to 2 mm were contained at 95%, and that fine powder of not larger than 180 μm did not substantially occur.

Embodiment 2:

The same raw molding materials as were used in Embodiment 1 were mixed in a blender, and the resultant materials were melt-kneaded by a heating roll. The kneaded product was rolled by immediately introducing the same between rolling rolls temperature-regulated to 40° C. and having a rolling clearance of 2 mm. The rolled product was introduced between paired first grooved rolls provided with continuous scrapers, and having a chip space width of 2 mm and a clearance (roll clearance) of 0.2 mm in width between free ends of opposed cutting edges to manufacture a sheet type material having longitudinal slits of 2 mm in width. This sheet type material was cut to a length of 400 mm with cutter, and the transfer direction of the material thus cut was then changed at 90 degrees by a direction changing unit. The resultant material was introduced into a clearance (roll clearance) of 0.2 mm in width between free ends of opposed cutting edges of paired second grooved rolls with scrapers and with a chip space width of 2 mm to obtain a sheet type molded material of a phenol resin having slits of a checker pattern 2 mm square.

The sheet type molded material thus obtained which had slits of a checker pattern was placed in a self-revolving miniaturized mixer, and processed for 15 minutes to obtain granulated materials. These materials were then sieved by using a vibrating screen to ascertain the grain size distribution thereof. The results showed that the granulated materials contained 93% of granulated materials of 1 to 2 mm in grain size and around 2% of fine powder of not larger than 180 μm in grain size.

Effects of the Invention:

According to the present invention, the molding material can be compacted in the rolling stage, and formed into a molding material which was difficult to be deformed even by an impact and a frictional force which the molding material receives in a subsequent stage. Even in the following first processing stage and second processing stage, granulated materials are obtained in a cutting processor a slitting process. Therefore, the rate of occurrence of fine powder which was not lower than 10% in a related art production system can be reduced to as low as several percent, and granulated materials of a desired uniform grain size can be obtained stably for a long period of time. Accordingly, the yield of the products can be improved greatly, and preferable effects concerning the environmental sanitation are obtained. Since the equipment is simple and compact, the plant and equipment investment can be held down to a low level.

What is claimed is:

1. A method of manufacturing molded materials of a the thermosetting resin composition in a method of granulating a molding material of the thermosetting resin composition, characterized in that a sheet producing step for transferring the molding material in a molten state to a subsequent stage while processing the same material into a sheet type material of a predetermined thickness, a first processing step for cutting the sheet type material, which has thus been transferred to a stage for carrying out this step, in parallel with the transfer direction thereof to a predetermined width, and thereby obtaining laterally arranged rows of processed bodies of elongated string-like materials, a step of cutting the processed body, which is obtained in the first processing step, to a predetermined length with respect to the transfer direction, a transfer direction changing step for transferring the processed body, which has been subjected to the cutting step, to a subsequent stage by changing the transfer direction of the processed body at 90 degrees with respect to the longitudinal processed body cutting line, and a second processing step for cutting the processed body, the transfer direction of which has been changed, in parallel with the processed body transferring direction to a predetermined width, and thereby obtaining granulated materials are carried out in order.

2. A method of manufacturing molded materials of a thermosetting resin composition according to claim 1, wherein a second processing step for making a multiplicity of slits in the transfer-direction-changed processed body after the transfer direction changing step has been carried out, in parallel with the transfer direction of the processed body to a predetermined width, and thereby obtaining a processed body of longitudinally arranged rows of elongated string-like materials having longitudinal slits of a predetermined width, and a step of applying an external force to the processed body of longitudinally arranged rows of elongated string-like materials obtained in the second processing step, and thereby obtaining granulated materials are carried out in order.

3. A method of manufacturing molded materials of a thermosetting resin composition according to claim 1, wherein the sheet producing step is carried out by rolling the molding material in a molten state the temperature of which is regulated to a temperature of 70 to 130° C. with rolling rolls, obtaining a sheet type material of 70 to 130° C., and transferring the sheet type material to a subsequent stage.

4. A method of manufacturing molded materials of a thermosetting resin composition according to claim 1, wherein the thermosetting resin is a phenol resin, an epoxy resin, a polyimide resin or a polyester resin.

5. A method of manufacturing molded materials of a thermosetting resin composition according to claim 1, wherein the granulated materials have a rectangular cross section 0.5 to 4 mm square.

6. A method of manufacturing molded materials of a thermosetting resin composition in a method of granulating a molding material of the thermosetting resin composition, characterized in that a sheet producing step for transferring the molding material in a molten state to a subsequent stage while processing the same material into a sheet type material of a predetermined thickness, a first processing step for making a multiplicity of slits in the sheet type material, which has been transferred to a stage for carrying out this step, in parallel with the transfer direction to a predetermined width, and thereby obtaining a sheet type processed body in which a multiplicity of longitudinal slits are formed, a step of cutting the sheet type processed body, which has been obtained in the first processing step, to a predetermined length with respect to the transfer direction, a transfer direction changing step for transferring the processed body, which have been subjected to the cutting step, to a subsequent stage by changing the transfer direction of the processed bodies at 90 degrees with respect to the longitudinal processed body cutting line, a second processing step for cutting the processed body, the transfer direction of which has been changed, in parallel with the processed body transferring direction to a predetermined width, and thereby obtaining a processed body of laterally arranged rows of elongated string-like materials in which a multiplicity of lateral slits are formed in a longitudinally spaced manner, and a step of applying an external force to the processed body of laterally arranged rows of elongated string-like materials, which have been obtained in the second processing step, and thereby obtaining granulated materials are carried out in order.

7. A method of manufacturing molded materials of at thermosetting resin composition according to claim 6, wherein a second step of making a multiplicity of slits after the execution of the transfer direction changing step in the processed body, the transfer direction of which has been changed, in parallel with the transfer direction to a predetermined width, and thereby obtaining a sheet type processed body having generally checker-patterned slits, and a step of applying an external force to the sheet type processed body obtained in the second processing step, and thereby obtaining granulated materials are carried out in order.

* * * * *